United States Patent [19]

Terneu et al.

[11] Patent Number: 5,256,485
[45] Date of Patent: Oct. 26, 1993

[54] COATED GLASS AND METHOD OF MANUFACTURING SAME

[75] Inventors: Robert Terneu, Thiméon; Michel Hannotiau, Jodoigne, both of Belgium

[73] Assignee: Glaverbel, Brussels, Belgium

[21] Appl. No.: 747,006

[22] Filed: Aug. 19, 1991

[30] Foreign Application Priority Data

Sep. 1, 1990 [GB] United Kingdom ............... 9019117

[51] Int. Cl.$^5$ ............................................. B32B 17/06
[52] U.S. Cl. ..................... 428/426; 428/336; 428/432; 428/433; 428/469; 428/697; 428/701
[58] Field of Search ............... 428/426, 432, 433, 336, 428/469, 697, 701

[56] References Cited

U.S. PATENT DOCUMENTS

| 4,160,061 | 7/1979 | Okino | 428/697 |
| 4,308,316 | 12/1981 | Gordon | 428/448 |
| 4,684,575 | 8/1987 | Beale | 428/433 |
| 4,971,843 | 11/1990 | Michelotti | 428/432 |

FOREIGN PATENT DOCUMENTS

| 1147412 | 4/1969 | United Kingdom . |
| 1397741 | 6/1971 | United Kingdom . |
| 1268405 | 3/1972 | United Kingdom . |
| 1276186 | 6/1972 | United Kingdom . |
| 1455148 | 11/1976 | United Kingdom . |
| 1547719 | 6/1979 | United Kingdom . |
| 2163146 | 2/1986 | United Kingdom . |
| 2199848 | 7/1988 | United Kingdom . |

Primary Examiner—Ellis P. Robinson
Assistant Examiner—Timothy M. Speer
Attorney, Agent, or Firm—Spencer, Frank & Schneider

[57] ABSTRACT

A coated glass substrate includes a glass substrate; and a metal oxide coating provided on the glass substrate, which metal oxide coating is a pyrolytically formed oxidized metal coating, includes a metal oxide layer whose metal constituents consist essentially of aluminum atoms and vanadium atoms in an amount ranging from about 2% to about 10% of the aluminum atoms, and has a refractive index of at least 1.67. Additionally, a coated glass substrate includes a glass substrate; a metal oxide undercoat which is provided on the glass substrate and which is a pyrolytically formed oxidized metal coating whose metal constituents consist essentially of aluminum atoms and vanadium atoms in an amount ranging from about 2% to about 10% of the aluminum atoms; and a tin oxide overcoat which is provided on the metal oxide undercoat and which is a pyrolytically formed tin oxide coating, wherein the metal oxide undercoat has an optical thickness selected to reduce reflected visible light optical interference effects due to the tin oxide overcoat. Such a tin oxide coated glass exhibits reduced iridescence and reduced interfacial haze from sodium ion migration.

10 Claims, No Drawings

COATED GLASS AND METHOD OF MANUFACTURING SAME

BACKGROUND OF THE INVENTION

Field of the Invention

This invention relates to a glass substrate bearing a pyrolytically formed oxidised metal coating, and to a method of pyrolytically forming an oxidised metal coating on a hot glass substrate by contacting the substrate with coating precursor material in the presence of oxygen.

The invention has particular and specific reference to glass bearing a tin oxide coating.

Tin oxide coatings on glass are known per se and find use in situations where heat energy conservation is of economic importance. Doped tin oxide coatings are effective in reflecting infra-red radiation, especially such radiation having wavelengths greater than 3000 nm, and they thus permit the transmission of solar heat energy while hindering the passage of infra-red radiation of long wavelengths from low temperature sources such as the interior of a building. However, when forming coatings over large areas of glass, difficulties may be encountered in making the coating uniform, and this can give rise to problems from the optical or aesthetic point of view. Consequently, the use of tin oxide coated glazings in inhabited buildings as opposed to such structures as greenhouses may not be as great as would appear to be justified by energy conservation and economic considerations. Conductive tin oxide coatings may also be used for other purposes, for example in electrical resistance heating panels, and similar optical and aesthetic considerations may apply there as well.

The problem is twofold. If a high luminous transmission is required it is necessary to make use of a thin coating. Unfortunately, such thin layers of tin oxide have optical thickness of the first few interferential orders and any variation in the thickness of the coating, no matter how small, consequently provokes the appearance of clearly visible interference colours in reflection. Such iridescence may be due to very small, unavoidable variations in the thickness of the tin oxide coating, but even in the case of a coating of perfectly uniform thickness, iridescence may be exhibited as the viewing angle of the coated glazing varies: this phenomenon can be of importance when considering large glazed areas which are a feature of some modern architectural practice.

The general theoretical principles according to which iridescence may be explained have been well known for many years. A given proportion of incident light will be reflected at any interface between two media of different refractive indices ($n_1$ and $n_2$). This is given by Fresnel's Equations which state that the proportion of normally incident light so reflected will be $(n_1-n_2)^2/(n_1+n_2)^2$.

Thus light will be reflected at the interface between a tin oxide coating and a glass substrate. If the tin oxide coating has an optical thickness within a certain range, the light reflected at that interface will interfere with the light reflected from the front face of the tin oxide coating. Even if the tin oxide coating has a perfectly uniform geometrical thickness, its apparent optical thickness will change with the viewing angle, and thus a variation in colour will be seen over the area coated.

Tin oxide coatings are also liable to transmit a certain proportion of light in a diffuse manner thus giving rise to haze. The problem of haze is generally attributed to the presence of sodium ions in the tin oxide coating. Pyrolytic tin oxide coatings are often made using tin chloride as coating precursor material, and one of the most frequent causes of haze is that sodium ions from the (soda-lime) glass react with the chlorine of the precursor material. Whatever be the precise derivation of the sodium in the coating, what is clear is that tin oxide coatings containing sodium exhibit haze.

Many proposals have been made to alleviate iridescence and/or to alleviate haze. Among the most relevant proposals are those which rely on the formation of an undercoating on the glass substrate before the tin oxide coating is applied. By way of example it has been proposed to apply a silicon dioxide undercoating prior to the deposition of a tin oxide overcoat. The silicon dioxide coating can be arranged substantially to prevent the migration of sodium from the glass into the tin oxide coating.

Also, the notion of providing "anti-reflection" coatings has been well known for many years. It follows from Fresnel's Equations that if a layer of a third medium is introduced between two other media, and if that third medium has a refractive index $n_3$ intermediate between $n_1$ and $n_2$, the refractive indices of those two media, the amount of light reflected at the two new interfaces thus formed will be reduced in comparison with that reflected at the previous single interface.

It also follows that the amounts of light reflected at the two interfaces formed by the intermediate ($n_3$) layer will be equal when the refractive index of that layer is equal to the square root of the product of the refractive indices of the other two media. Thus, if the thickness of that intermediate layer is selected so that light of a given wavelength reflected at its two interfaces is 180° out of phase, then a significant proportion of visible light reflected internally of the coated structure will be extinguished by interference, and the iridescent effect will be further diminished.

Thus, given that the refractive index of a pyrolytically formed tin oxide coating is about 1.9, and that the refractive index of a typical soda-lime glass is 1.52, theory predicts that it would be desirable to form an interlayer of a material having a refractive index of about 1.7, and in order to achieve interference extinction of reflected light having a wavelength Lambda of about 560 mn, in the region where the human eye is most sensitive, that interlayer should define a light path of effective length equal to Lambda/2 and thus have an optical thickness of Lambda/4, namely 140 nm, so that its geometrical thickness would be about 80 nm.

It is an object of this invention to provide a glass substrate with a multilayer coating including a pyrolytically-formed tin oxide overcoat which is of acceptably low haze and acceptably low iridescence due to the presence of an undercoat of new composition.

According to the present invention, there is provided a glass substrate bearing a pyrolytically formed oxidised metal coating, characterised in that such coating comprises a pyrolytically formed oxidised metal substratum ("the undercoat") in which said metal comprises aluminium with a relatively minor proportion of vanadium, and a pyrolytically formed upper coating stratum ("the overcoat") of tin oxide over the undercoat, the optical thickness of the undercoat being selected for the reduction of reflected visible light interference effects due to the overcoat.

The present invention extends to a method of manufacturing such a coated glass substrate, and thus includes a method of pyrolytically forming an oxidised metal coating on a hot glass substrate by contacting the substrate with coating precursor material in the presence of oxygen, characterised in that an oxidised metal substratum ("the undercoat") of said coating is pyrolytically formed by contacting the substrate at an undercoating station with an undercoating precursor material containing aluminium atoms and a relatively minor proportion of vanadium atoms so that the oxidised metal of such undercoat comprises aluminium with a minor proportion of vanadium, whereafter an upper coating stratum ("the overcoat") of tin oxide is pyrolytically formed over the undercoat, the optical thickness of the undercoat being selected for the reduction of reflected visible light interference effects due to the overcoat.

Such a coating is substantially neutral in reflection and it exhibits low haze. The product may thus be embodied as glazing panels which are optically and aesthetically acceptable for incorporation into inhabited buildings, even where the glazed area is extensive. The product may be embodied as a low emissivity, infra-red screening panel, or as a resistance heating panel, for example a heatable vehicle window. The process of the invention may be performed using apparatus of a type known per se, for example apparatus such as is described in Glaverbel's British Patent Specification No 2,185,249.

Indeed glass having such an oxidised aluminium/vanadium coating is itself new, and advantageous, and in its second aspect, the invention provides a glass substrate bearing a pyrolytically formed oxidised metal coating, characterised in that such coating comprises a layer in which said metal comprises aluminium with a relatively minor proportion of vanadium and which has a refractive index of at least 1.67, and preferably a refractive index of at least 1.69.

The incorporation of minor proportions of oxidised vanadium in the oxidised aluminium coating layer is believed to be of especial value in affording a measure of control over the refractive index of that coating layer so that that refractive index can be brought to a value in the mid-range between the values of the refractive indices of glass and tin oxide. In fact, the theoretical refractive index of massive crystalline aluminium oxide is 1.76, but aluminium oxide coatings formed by pyrolysis generally have a refractive index of about 1.6. By the addition of minor proportions of vanadium, it is easily possible to achieve a refractive index for the oxidised aluminium/vanadium layer of 1.67 or more. This is a wholly unexpected effect because the theoretical refractive index of vanadium pentoxide, which is the most stable vanadium oxide and the easiest to produce, is no greater than that of aluminium oxide. The effect is thus not attributable to the fact that one is admixing a material of higher refractive index when one might indeed expect the refractive index of the mixture to be calculated from the refractive indices of the ingredients and their proportions in the mixture. This is not to imply that the coating layer necessarily contains vanadium pentoxide as such. Indeed some samples incorporating such a coating layer have been subjected to X-ray diffraction analysis, and the diffraction pattern of vanadium pentoxide has been absent. It may be that the vanadium is present as aluminium vanadate, but this is not certain.

Nonetheless, it is convenient to speak of that layer as though it comprised a mixture of aluminium and vanadium oxides.

It is found that the undercoating layer is crystalline, and that the crystal structure is in the tetragonal system. It may be that it is this modification to the crystal habit of aluminium oxide, which we attribute to the presence of the vanadium, which affords the increase in refractive index, but the reasons for that phenomenon are not entirely clear.

Another possible explanation is that the presence of vanadium in the aluminium oxide based coating promotes compacity of that coating layer thus leading to the observed high refractive index.

There is an even more surprising effect of using an aluminium-vanadium based oxide layer as a substratum beneath a tin oxide based layer. When an aluminium-vanadium based oxide layer having a refractive index of 1.67 is overcoated with a tin oxide based layer, the effective refractive index of the underlayer is increased to about 1.695.

A possible explanation of this is that there is an interpenetration of the two layers during the formation of the overcoating layer. The similarity in the crystalline habit of the two layers—they are both in the tetragonal system—may play some rôle in this phenomenon. But be that as it may, the increase in refractive index is notable, and it does not depend on any theoretical explanation.

A further advantage of vanadium-containing aluminium oxide coatings according to this invention lies in their much improved mechanical properties as compared with pyrolytically formed aluminium oxide coatings. In the absence of vanadium, such coatings are somewhat powdery and do not have good adherence to the glass. The inclusion of vanadium has the surprising effect of greatly improving the mechanical properties of the coating.

In preferred embodiments of the invention, the tin oxide overcoat is formed to a geometrical thickness in the range 250 nm to 700 nm. Doped tin oxide coatings of such geometrical thicknesses are found to be efficacious for affording low emissivity of infra-red radiation and a high luminous transmission, and also, such coatings in that range of geometrical thickness are particularly liable to exhibit iridescence so that the adoption of the present invention affords the greatest advantages there.

Advantageously, the undercoat is formed to a geometrical thickness in the range 65 nm to 100 nm, and preferably in the range 75 nm to 100 nm. Thicknesses for the undercoat within such a range are found to afford the greatest benefit both in terms of haze reduction and in the reduction of iridescence.

There are various ways in which such an undercoat may be formed. In the most preferred embodiments of the invention, an undercoating precursor solution comprising aluminium acetyl acetonate and vanadium acetyl acetonate is sprayed to contact the substrate at said undercoating station. Such organo-metallic compounds readily decompose under pyrolytic coating conditions to yield a mixed oxide coating of aluminium oxide and vanadium oxide whose refractive index is reliably and consistently reproducible with a given composition of the mixture sprayed. It is especially suitable for such precursor solution to contain glacial acetic acid as solvent.

The undercoat may for example contain vanadium atoms in an approximate proportion of between 2 and 10% of aluminium atoms, this range being deduced from the number of impulses observed in an X-ray fluorescence technique. The addition of such quantities of vanadium to the oxidised metal undercoat layer is especially beneficial in affording a refractive index to that layer which is close to the square root of the product of the refractive indices of glass and tin oxide. This is valuable for reducing reflection at the interface between the tin oxide and the immediately subjacent surface, so providing an inherently lower capacity for iridescence. The proportion of vanadium oxide in the aluminium oxide based layer is to be kept low because its presence tends to promote light absorption within that layer and such absorption is usually not desired.

Advantageously, the undercoating is formed on a freshly formed ribbon of hot glass. This saves energy in reheating cool glass, for example pre-cut glass sheets, to the temperatures required for the pyrolytic coating reactions to take place, and it tends to ensure that the surface of the glass is in pristine condition for receipt of the coating. The two coating stations required for applying the undercoat and the overcoat of the invention may for example be located between the exit from a glass ribbon forming apparatus and the entrance to an annealing lehr for that ribbon.

The ribbon forming apparatus may be a glass drawing plant, but it is preferred that the glass ribbon is a ribbon of float glass. Float glass is generally of higher optical quality than drawn glass, so it is preferred to coat a substrate of float glass.

DESCRIPTION OF THE PREFERRED EMBODIMENTS

The invention will now be described by way of example.

Two coating stations are located in succession between the exit from a float glass chamber in which a continuous glass ribbon is formed and a horizontal annealing lehr through which that ribbon is passed before it is cut into sheets. Each coating station comprises a spray gun mounted for to and fro movement across the path of advance of the ribbon, and an aspirator for drawing off coating reactions products and unused coating precursor material. A radiant heater is placed above the path of the ribbon between the two coating stations to compensate for any heat loss or temperature inequalities in the ribbon due to the energy taken up by the coating reactions which take place in the first coating station where the undercoat is deposited.

EXAMPLE 1

In a specific practical example, for forming the undercoat, a solution is made up in glacial acetic acid, which contains, per liter, 220 grams aluminium acetylacetonate, $Al(C_5H_7O_2)_3$, and about 12 grams vanadium tri-acetylacetonate, $V(C_5H_7O_2)_3$. This solution is sprayed through a reciprocating spray head to contact the travelling ribbon of hot glass while its temperature is in excess of 550° C. in order to form in situ a coating 75 nm in geometrical thickness. The resulting coating is formed from an oxidised mixture of aluminium and vanadium. The coating has a refractive index of 1.67.

The undercoated ribbon substrate then passes beneath the radiant heater and into the second coating station where the overcoat of tin oxide is formed in a manner known per se, by spraying an aqueous solution of stannous chloride containing ammonium bifluoride (for the provision of doping ions in the coating) to form a coating 300 nm in geometrical thickness. The effective refractive index of the undercoating layer is increased to 1.695.

The resulting coating is neutral in reflection and thus free from perceptible iridescence. The Hunter colour co-ordinates for this two-layer coating are $a = -0.1$ and $b = +0.5$. Haze is noted as less than 0.3% diffuse transmission. The emissivity of the tin oxide coating in respect of infra-red radiation having wavelengths greater than 3000 nm is 0.16 and the total visible light transmission of the coated glass sheet (6 mm in thickness) is 82%. Variations in thickness of the tin oxide overcoat of up to ±40 nm could be tolerated without giving rise to perceptible interference effects.

EXAMPLE 2

In a second specific practical example, for forming the undercoat, a solution is made up in glacial acetic acid, which contains, per liter, 180 grams aluminium acetylacetonate, $Al(C_5H_7O_2)_3$, and about 20 grams vanadium tri-acetylacetonate, $V(C_5H_7O_2)_3$. This solution is sprayed through a reciprocating spray head to contact the travelling ribbon of hot glass while its temperature is in excess of 550° C. in order to form in situ a coating 70 nm in geometrical thickness. The resulting coating is formed from an oxidised mixture of aluminium and vanadium.

The undercoated ribbon substrate then passes beneath the radiant heater and into the second coating station where an overcoat of tin oxide is formed in a manner known per se, to a geometrical thickness of 500 nm using the precursor material of Example 1. The undercoating layer has an effective refractive index of 1.7.

The resulting coating is neutral in reflection and thus free from perceptible iridescence. The Hunter colour co-ordinates for this two-layer coating are close to zero. Haze is noted as less than 0.3% diffuse transmission. The emissivity of the tin oxide coating in respect of infra-red radiation having wavelengths greater than 3000 nm is 0.2 and the total visible light transmission of the coated glass sheet (6 mm in thickness) is 78%.

What is claimed is:

1. A coated glass substrate, comprising:
   a glass substrate;
   a metal oxide undercoat which is provided on the glass substrate and which is a pyrolytically formed oxidized metal coating whose metal constituents consist essentially of aluminum atoms and vanadium atoms in an amount ranging from about 2% to about 10% of the aluminum atoms; and
   a tin oxide overcoat which is provided on the metal oxide undercoat and which is a pyrolytically formed tin oxide coating,
   wherein the metal oxide undercoat has an optical thickness selected to reduce reflected visible light optical interference effects due to the tin oxide overcoat.

2. The coated glass substrate according to claim 1, wherein the tin oxide overcoat has a geometrical thickness ranging from 250 nm to 700 nm.

3. The coated glass substrate according to claim 1, wherein the metal oxide undercoat has a geometrical thickness ranging from 65 nm to 100 nm.

4. The coated glass substrate according to claim 3, wherein the metal oxide undercoat has a geometrical thickness ranging from 75 nm to 100 nm.

5. The coated glass substrate according to claim 1, wherein the metal oxide undercoat has a refractive index of at least 1.69.

6. A coated glass substrate, comprising:
a glass substrate; and
a metal oxide coating provided on the glass substrate, which metal oxide coating is a pyrolytically formed oxidized metal coating, comprises a metal oxide layer whose metal constituents consist essentially of aluminum atoms and vanadium atoms in an amount ranging from about 2% to about 10% of the aluminum atoms, and has a refractive index of at least 1.67.

7. The coated glass substrate according to claim 6, wherein said metal oxide layer has a refractive index of at least 1.69.

8. The coated glass substrate according to claim 1, wherein the glass substrate is float glass.

9. The coated glass substrate according to claim 6, wherein the glass substrate is float glass.

10. The coated glass substrate according to claim 1, wherein the metal oxide undercoat has a refractive index of at least 1.67.

* * * * *